(12) United States Patent
Shiao

(10) Patent No.: US 6,837,461 B1
(45) Date of Patent: Jan. 4, 2005

(54) BALANCE LOAD ACTUATOR

(75) Inventor: Sam Shiao, Cerritos, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/638,028

(22) Filed: Aug. 8, 2003

(51) Int. Cl.[7] ................................................ B64C 1/14
(52) U.S. Cl. ............... 244/129.5; 292/127; 292/169.11; 49/356
(58) Field of Search ........................... 244/129.4, 129.5, 244/131, 134 F; 292/127, 169.11, 169.17; 49/136, 138, 139, 140, 324, 325, 326, 329, 330, 344, 356

(56) References Cited

U.S. PATENT DOCUMENTS

| | | | |
|---|---|---|---|
| 754,721 A | * | 3/1904 | Tower ........................ 292/127 |
| 2,073,350 A | * | 3/1937 | Oshorn ........................ 244/38 |
| 2,239,301 A | * | 4/1941 | Papst ............................ 292/1 |
| 2,258,680 A | * | 10/1941 | Hill ............................ 292/127 |
| 2,387,800 A | | 10/1945 | Leland |
| 2,391,275 A | * | 12/1945 | Shaw ............................ 74/581 |
| 2,445,235 A | * | 7/1948 | Myers ........................ 89/37.19 |
| 2,763,900 A | * | 9/1956 | McAfee et al. ................ 49/70 |
| 3,128,068 A | * | 4/1964 | Pauli ....................... 244/129.5 |
| 3,394,499 A | * | 7/1968 | Korthaus et al. ............. 49/340 |
| 3,416,757 A | * | 12/1968 | Maraghe .................. 244/129.5 |
| 3,568,979 A | | 3/1971 | Notenboom |
| 3,591,111 A | * | 7/1971 | Spence .................... 244/137.1 |
| 3,718,171 A | * | 2/1973 | Godwin ....................... 160/210 |
| 3,858,452 A | * | 1/1975 | Gatland et al. ........... 74/424.78 |
| 4,429,491 A | * | 2/1984 | Bruns .......................... 49/340 |
| 4,613,099 A | * | 9/1986 | Smith et al. .............. 244/53 R |
| 4,817,977 A | | 4/1989 | Bookbinder |
| 4,902,051 A | * | 2/1990 | Poe ............................ 292/127 |
| 5,018,687 A | * | 5/1991 | Kupfernagel et al. ..... 244/129.5 |
| 5,040,747 A | * | 8/1991 | Kane et al. ............. 244/102 R |
| 5,203,215 A | * | 4/1993 | Baudu et al. ............. 74/483 R |
| 5,449,190 A | | 9/1995 | Ford |
| 5,513,467 A | * | 5/1996 | Current et al. ................ 49/340 |
| 5,704,569 A | * | 1/1998 | Daniels .................... 244/129.5 |
| 6,059,231 A | * | 5/2000 | Dessenberger, Jr. ....... 244/129.5 |
| 6,108,975 A | | 8/2000 | Bailey |
| 6,279,971 B1 | * | 8/2001 | Dessenberger, Jr. ......... 292/113 |
| 6,325,428 B1 | * | 12/2001 | Do .............................. 292/113 |
| 6,530,178 B1 | | 3/2003 | Kowalczyk et al. |
| 6,629,712 B2 | * | 10/2003 | Jackson et al. ............. 292/263 |
| 6,685,139 B2 | * | 2/2004 | Blum et al. ............... 244/129.5 |
| 2003/0132347 A1 | * | 7/2003 | Blum et al. ............... 244/129.5 |
| 2004/0056153 A1 | * | 3/2004 | Barba ....................... 244/129.5 |

* cited by examiner

*Primary Examiner*—Michael J. Carone
*Assistant Examiner*—Stephen A Holzen
(74) *Attorney, Agent, or Firm*—Oral Caglar, Esq.

(57) ABSTRACT

The present invention provides a balance load actuator for effecting motion between a first part and a second part. An embodiment of the present invention comprises a main housing; a shaft; a motion transfer assembly; and a load balancing assembly. The balance load actuator receives substantial external loads through a load balance assembly and distributes the loads to the main housing, thus relieving undue stress otherwise exerted on the shaft and enabling lighter and smaller design components and construct.

22 Claims, 4 Drawing Sheets

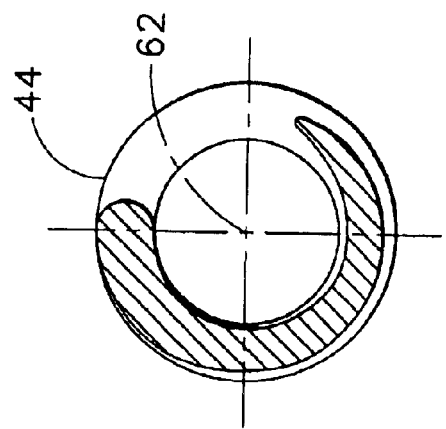
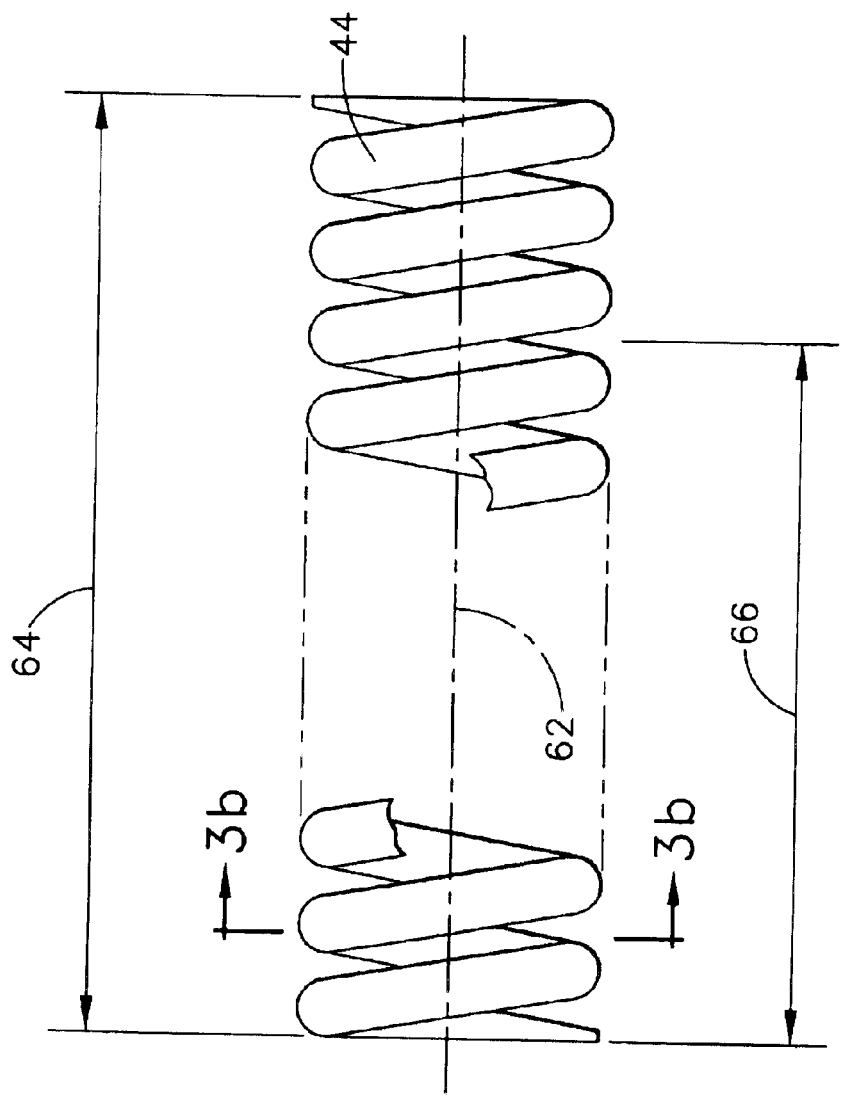
FIG. 3b
FIG. 3a

US 6,837,461 B1

BALANCE LOAD ACTUATOR

BACKGROUND OF THE INVENTION

The present invention generally relates to actuators and, more particularly, to actuators for aircraft.

Current technology includes actuator devices movable between an operative position and inoperative position, for instance, facilitating movement of a door panel between a closed position and an open position relative to a structural member. Such devices often employ a motor and gear assembly to facilitate moving the door panel to an open position, and a spring assembly or other tension mechanism to store energy and transfer the stored energy upon extension or compression to, for example, effect closure of the door panel.

Aircraft door actuators are typically designed according to specific, predetermined load tolerances. For example, various actuators are designed to withstand in-flight loads such as low-altitude external air pressure and high-altitude internal air pressure. Other actuators are designed to withstand relatively greater loads, including high-pressure liquid forces exerted on the aircraft during de-icing processes or in-flight ice-breaking load for opening a door under emergency circumstances. In general, the weight of an actuator and the size of its components increase correlatively to its associated loads. Therefore, actuators designed for relatively significant loads are typically relatively heavy in weight and large in size, resulting in increased production and performance costs.

For example, a linear drive power door operator disclosed in U.S. Pat. No. 5,513,467 to Current et al. includes an elongate closer body housing; a power screw disposed therein; a drive; a rack and pinion assembly; a link arm; and a control device. An actuator disclosed in U.S. Pat. No. 2,387,800 to Leland et al. includes a closure member; a spring loaded shifter connected to the closure member and operative to actuate said member; a latch engaging said shifter and releasably holding it in spring loaded position; a screw shaft with a non-rotatable nut threaded thereon; and means on said nut to engage the latch and release said shaft and to strike said shifter and start it on its spring actuated movement.

As can be seen, there is a need for an improved method and apparatus, such as an actuator, to move a first member to various positions relative to a second member. Further, there is a need for such an actuator to withstand significant load forces. Finally, there is a need for such an actuator to be designed, manufactured, and transported in a cost-efficient manner while exhibiting characteristics such as a lightweight design and embodiment.

SUMMARY OF THE INVENTION

An aspect of the present invention includes a main housing; a motion transfer assembly mechanically associated with the housing; and a load balancing assembly mechanically associated with the housing.

Another aspect of the present invention includes a main housing having a tail end connected to a structural member; a shaft embedded inside, or otherwise mechanically associated with, the main housing; a gear assembly mechanically associated with the shaft and the main housing; a motor mechanically associated with the shaft and the gear assembly; a rod end having an eye, a shank, and a foot; the eye of the rod end connected to a movable member or door frame and the foot of the rod end mechanically associated with the shaft; a spring housing having a base and a side; a connector affixing the base of the spring housing to the main housing; a spring having one end and a distal end, the one end affixed to the base of the spring housing; and an end cap to which the distal end of the spring is affixed, the end cap substantially surrounding and interacting with the shank of the rod end.

Yet another aspect of the present inventions includes a main housing having a tail end connected to an aircraft structure and a rod end connected to the door panel; a shaft connected to the main housing; a gear assembly mechanically associated with the shaft and the housing; a motor mechanically associated with the shaft and the gear assembly; a rod end having an eye, a shank and a foot; the eye of the rod end connected to a movable member and the foot of the rod end mechanically associated with the shaft; a spring housing having a side and a base, the base having a threaded joint integrally or independently (as a connector) articulated to the main housing; a spring having one end and a distal end, the one end affixed to the base of the spring housing; a disk forming an aperture therein, the disk having an inside diameter with threading mechanically associated with the shank of the rod end, an outside perimeter area to which the distal end of the spring is affixed, and a beveled edge; a latch assembly connecting the side of the spring housing and the end cap; and a solenoid device mechanically associated with the latch assembly.

A further aspect of the invention includes an aircraft structure; a movable member or door frame; a main housing having a tail end connected to the aircraft structure; a rod end having an eye, a shank, and a foot; the eye of the rod end connected to the movable member; a shaft mechanically associated with the foot of the rod end; a gear assembly mechanically associated with the shaft and the housing; a motor mechanically associated with the shaft and the main housing; a spring housing having a base and a side; a spring having one end and a distal end, the one end affixed to the base of the spring housing; and an end cap affixed to the distal end of the spring.

A method of the present invention includes the steps of transferring motion from a motion transfer assembly to a shaft associated with a main housing to selectively extend and retract the shaft from and into the main housing; receiving a load from an external source by a load balancing assembly; and transferring the load from the load balancing assembly to the main housing and to a structural member.

Another method of the present invention includes the steps of transferring motion from a motor to a shaft via a gear assembly, the shaft and the gear assembly associated with a main housing; selectively expanding and compressing a spring attached to spring housing and an end cap, the end cap surrounding and interacting with a rod end attached to the shaft; and transferring a load from an external source to the main housing via the rod end, the end cap, and the spring.

These and other features, aspects and advantages of the present invention will become better understood with reference to the following drawings, description and claims.

BRIEF DESCRIPTION OF THE DRAWINGS

FIG. 3a is a side view of a spring according an embodiment of the present invention;

FIG. 3b is a cross-sectional view taken along line 3b—3b of the spring of FIG. 3a, according to an embodiment of the present invention;

DETAILED DESCRIPTION OF THE INVENTION

Figure 1:
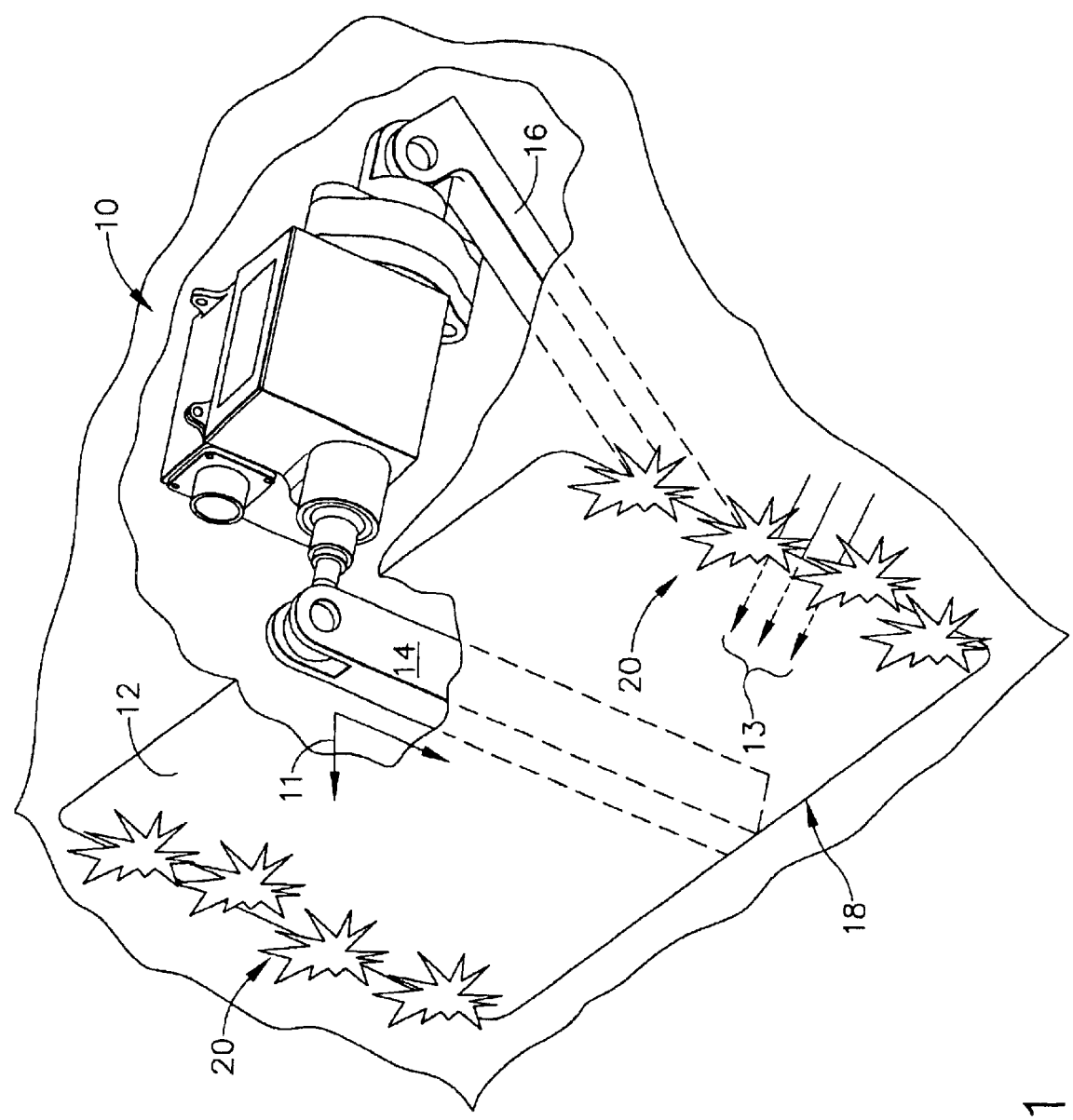
FIG. 1 is an environmental, perspective view of an embodiment according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the balance load actuator of the present invention provides superior initial load in a lightweight, efficient construct. It is contemplated that the present invention may be used, *inter alia*, in aircraft and other mechanical environments wherein the actuator must sustain substantial forces exerted on it from external sources. For example, the contemplated uses include employment as a load balancing actuator for opening and closing an aircraft door panel, whereby the present invention facilitates selective movement of the door panel and overcomes the restraining loads such as breaking the ice formed around the door panel as well as typical in-flight air pressures. The balance load actuator of the present invention achieves these results by a load balancing assembly for transferring or distributing said forces to preselected components of the balance load actuator. In contrast, actuators of the prior art lack means to selectively distribute or balance these forces. In operation, the prior art actuators receive external forces via a connector component facilitating a connection between door panels or structural members and an actuator shaft. The connector component transfers and distributes these forces directly to a motion transfer component, such as a shaft, gear train and motor. The shaft must be heavy and large enough to withstand such forces. The relatively heavy weight and large size of the shafts, gear train and motor of prior art actuators present a distinct disadvantage in terms of increased costs of materials, production, shipping, and operation, where overall aircraft design and performance must accommodate such unwieldy components.

More specifically, the present invention may provide a main housing that comprises a structural support member capable of housing one or more components of the motion transfer assembly. Upon selective actuation, one or more components of the motion transfer assembly may move axially from a first position substantially within the main housing to a second position, extending substantially outside of the main housing. Further selective actuation can retract the component along the same axis, re-housing the component in the main housing.

Independent of actuation and without regard to a specific position of components of the motion transfer assembly, the load balancing assembly of the present invention functions to receive an external load and transfer the load directly into the main housing, thus providing substantial load resistance despite a relatively lightweight construction; or to provide a predetermined spring force to offset the required external forces such as ice-breaking loads.

Referring now to the drawings, wherein similar reference characters designate corresponding parts throughout the drawings, there is shown an embodiment of a balance load actuator 10 according to the present invention. The balance load actuator 10 may be used in conjunction with an aircraft assembly to open and close, for example, a door panel 12. The balance load actuator may be mounted on the door panel 12 via a door frame 14 and a structural member 16. Actuation can extend or retract one or more components of the balance load actuator 10, exerting a force 11 on the door panel 12 and effecting the opening or closure of the door panel 12, hinged along a hinge line 18. The balance load adaptor 10 is well adapted to withstand loads 13 such as ice formations 20 as shown on the door panel 12, as well as high-pressure removal of the ice formations via fluid dispersion.

Figure 2:
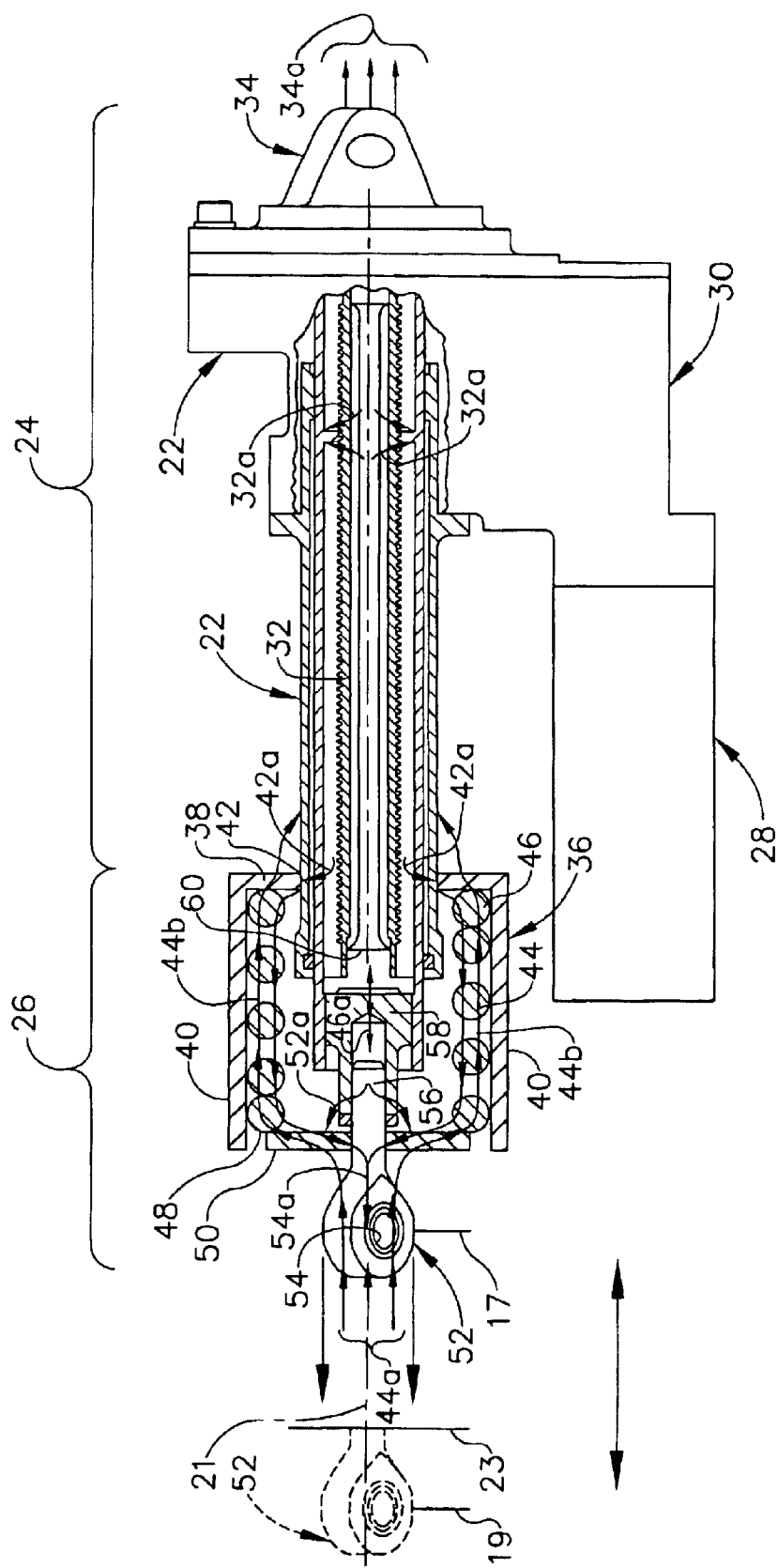
FIG. 2 is a cross-sectional view taken along line 2—2 of the balance load actuator depicted in FIG. 1, according to an embodiment of the present invention.

With reference to FIG. 2, there is shown a cross-sectional view taken along line 2—2 of FIG. 1 of the balance load actuator 10 in a retracted position, shown relative to line 17. The balance load actuator 10, or various components thereof, may extend axially along phantom line 21, for example, to a second position, shown relative to line 19, according to an embodiment of the present invention. The balance load actuator 10 may comprise, for example, a main housing 22, a motion transfer assembly 24, and a load balancing assembly 26.

The motion transfer assembly 24 may comprise, for example, a motor 28, a gear assembly 30, and a shaft 32 supported by the main housing 22, all of which may be operatively connected in the fashion described below. A tail end 34 of the main housing 22 may be connected, for example, to the structural member 16.

The load balancing assembly 26 may comprise, for example, a spring housing 36 having a base 38 and sides 40 removably or fixedly attached to the main housing 22 by, for example, a threaded joint 42. The spring housing 36 may house a spring 42, such as a coiled spring, having one end 46 affixed to the base 38 of the spring housing 36, and having a distal end 48 connected to an end cap 50 having an aperture (not shown). A rod end 52 (having an eye 54, a shank 56, and a foot 58) may engage the shaft 32; i.e., upon extension of the shaft 32, an end 60 of the shaft 32 may contact the foot 58 of the rod end 52. The rod end 32 can pass through the aperture (not shown) of the end cap 50, where the shank 56 of the rod end 52 can be mechanically associated with an inside diameter (not shown) of the end cap 50. The eye 54 of the rod end 52 can be attached to, for example, the movable door frame 14.

With continuing reference to FIG. 2, in operation, the motor 28 may transfer energy, and therefore, motion to the gear assembly 30, which is in mechanical communication with the shaft 32. As a skilled artisan will note, gear assemblies are well known in the art. Therefore, any combination of components necessary to carry out the function described herein may be employed. The gear assembly 30 can drive the shaft 32; i.e., extend or retract the shaft 32 from or into the main housing 22. Upon extension of the shaft 32, the end 60 of the shaft 32 may contact the foot 58 of the rod end 52, resulting in applied force 44b on the main housing 22, which exerts a force 34a upon its tail end 34 to the structural member 16. The exertion forces 44b move the door panel 12 from a closed position to an open position, relative to the structural member 16. Similarly, retraction of the shaft 32 into the main housing 22 may cause the door panel 12 to move from the open position to the closed position. During operation, the rod end 52 may be axially transferred from a first position to a second position.

Selective motion transfer to the rod end 52 may also result in a force 52a exerted against the end cap 50 by the rod end 52, driving the end cap 50 axially in a direction away from the tail end 34 of the main housing 22, thus axially expanding the spring 44 from the base 38 of the spring housing 36 to, for example, the position shown by line 23, where the rod end 52 is shown in phantom. The extended spring 44 may be used to create a pulling force 42a for example, to selectively urge the main housing 22 and its tail end 34 away from the structural member 16, in effect pulling the door panel 12 to a closed position relative to the structural member 16. Conversely, the spring 44 may be selectively compressed and used to create a pushing force 54a for various functions such as urging the rod end 52 toward the door frame 14.

Most notably, however, the spring 40 can function to distribute external loads exerted on the balance load actuator 10, particularly the shaft 32. For example, a force 46a exerted on shaft 32 can be transferred—via the foot 58 of the rod end 52—to the shank 56 of the rod end 52. The shank 56 of the rod end 52 may then distribute, as depicted by arrow 52a, the load to the end cap 50 and the distal end 58 of the spring 44. The spring 44 may disseminate the load 44a via its one end 46 through the base 38 of the spring housing 36 to the main housing 22 via the threaded joint 42. In various other embodiments, for example, the motor 28 may reverse a turning direction to extend the shaft 32 via the gear assembly 30, thereafter transferring motion from the spring 44 in an initially compressed state, directly to the load. In this manner, the shaft 32 is relieved of various forces exerted upon it, resulting in various actuator designs and embodiments comprising smaller, lighter structures within the scope of the present invention.

Turning now to FIGS. 3a and 3b, there are respectively shown a side view and a cross-sectional view of the spring 44 according to an embodiment of the present invention. FIG. 3b is taken along line 3b—3b of FIG. 3a. It is contemplated that the spring 44 may present with a predetermined free height 64 and compresses to a predetermined compressed height 68. The spring 44 may compress and expand along an axis 62.

Figure 4B:
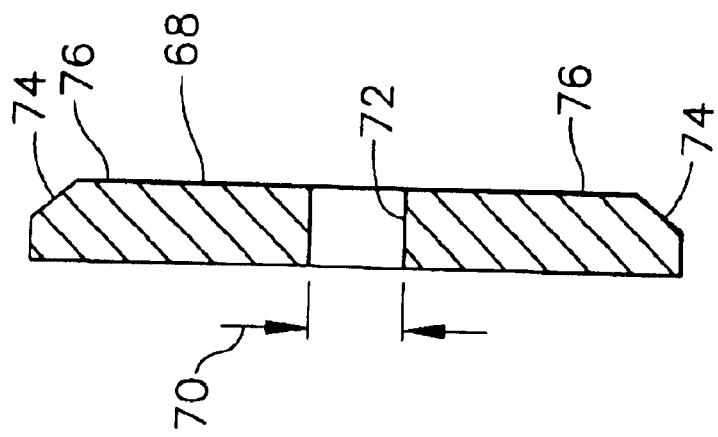
FIG. 4b is a cross-sectional view taken along line 4b—4b of the disk of FIG. 4a, according to an embodiment of the present invention.
Figure 4A:
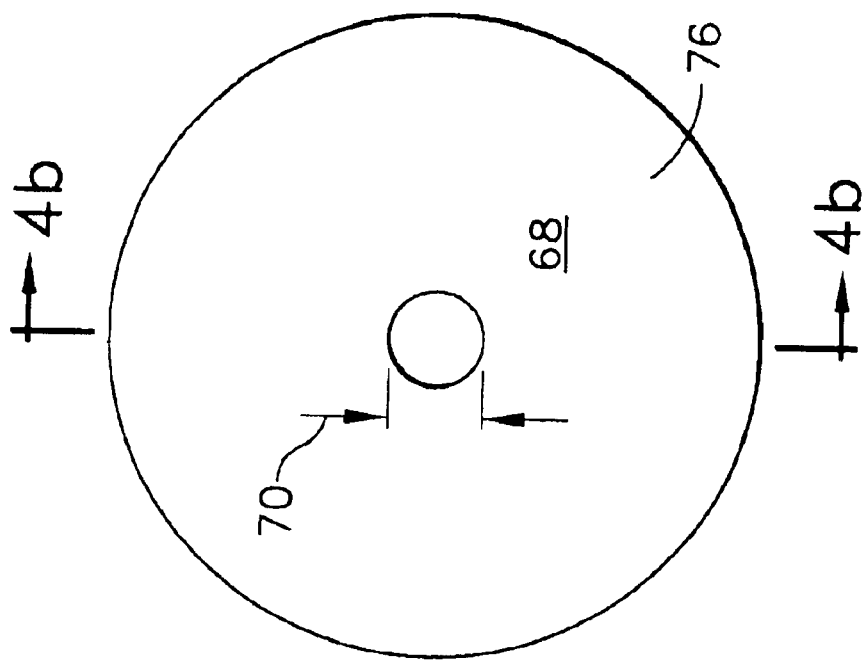
FIG. 4a is a top view of a disk according to an embodiment of the present invention.

With reference now to FIGS. 4a and 4b, there are respectively shown a top view and a cross-sectional view of a disk 68 according to an embodiment of the present invention. FIG. 4b is taken along line 4b—4b of FIG. 4a. In various embodiments, the end cap 50 may comprise the disk 68 forming an aperture 70 therein. The disk 68 may include an inside diameter 70 with threading for affixation to the shank 56 of the rod end 52. The disk 68 may comprise a beveled edge 74 for mechanical association with the distal end 48 of the spring 44, the sides 40 of the spring housing 36, or both. In various embodiments, the distal end 48 of the spring 44 may be affixed to an outside perimeter area 76.

Alternatively, the balance load actuator may comprise a latch assembly (not shown) and a solenoid device (not shown). The latch assembly may latch the end cap 50 to the spring housing 36. The solenoid device, in electrical communication with the latching assembly, may unlatch the end cap 50 from the spring housing 36, thereby eliminating the need for the motor 28 to supply continuous electric power to keep the spring 44 in a compressed state. For example, in various embodiments, once the solenoid device unlatches the end cap 50, the motor 28 may reverse a turning direction to extend the shaft 32 via the gear assembly and the motion may be transferred directly from the spring 44, in compressed state, to the load.

It should be understood, of course, that the foregoing relates to preferred embodiments of the invention and that modifications may be made without departing from the spirit and scope of the invention as set forth in the following claims.

I claim:

1. An apparatus for effecting movement of a movable member relative to a structural member, the apparatus comprising:
   a main housing;
   a motion transfer assembly mechanically associated with the housing;
   the motion transfer assembly including a shaft;
   a load balancing assembly mechanically associated with the housing for receiving a load and distributing it directly to the main housing; and
   a rod end having an eye, a foot, and a shank, the foot of the rod end mechanically associated with the shaft;
   the load balancing assembly including:
      a spring housing having a base;
      a spring having one end and a distal end, the one end affixed to the base of the spring housing; and
      an end cap with an inside diameter and a beveled edge;
   wherein the shank is mechanically associated with the inside diameter of the end cap.

2. The apparatus of claim 1, wherein the eye of the rod end is connected to the movable member.

3. The apparatus of claim 1, further comprising a connector affixing the load balancing assembly to the main housing.

4. The apparatus of claim 1, wherein the main housing comprises a tail end connected to the structural member.

5. The apparatus of claim 1, wherein the structural member comprises a door panel.

6. The apparatus of claim 1, wherein the motion transfer assembly comprises:
   a shaft mechanically associated with the foot of the rod end, with the shaft being enclosed in the main housing;
   a gear assembly mechanically associated with the shaft; and
   a motor mechanically associated with the gear assembly.

7. An apparatus for effecting movement between a structural member and a movable member, the apparatus comprising:
   a main housing having a tail end connected to the structural member;
   a shaft connected to the main housing;
   a gear assembly mechanically associated with the shaft and the main housing;
   a motor mechanically associated with the shaft and the gear assembly;
   a rod end having an eye, a shank, and a foot; with the eye of the rod end connected to the movable member and with the foot of the rod end mechanically associated with the shaft;
   a spring housing having a base and a side;
   a connector affixing the base of the spring housing to the main housing;
   a spring for receiving a load and distributing the load to the main housing via the base of the spring housing and the connector, the spring having one end and a distal end, with the one end affixed to the base of the spring housing; and
   an end cap, including a beveled edge, to which the distal end of the spring is affixed, with the end cap surrounding and interacting with the shank of the rod end.

8. The apparatus of claim 7, wherein the connector comprises a threaded joint articulated to the main housing.

9. The apparatus of claim 7, wherein the end cap comprises a disk forming an aperture therein.

10. The apparatus of claim 9, wherein the disk further comprises an inside diameter having threading mechanically associated with the shank of the rod end.

11. An apparatus for effecting movement of an aircraft door panel relative to a movable member, the apparatus comprising:
- a main housing having a tail end connected to the aircraft door panel;
- a shaft connected to the main housing;
- a gear assembly mechanically associated with the shaft and the housing;
- a motor mechanically associated with the shaft and the gear assembly;
- a rod end having an eye, a shank, and a foot with the eye of the rod end connected to the movable member and with the foot of the rod end mechanically associated with the shaft;
- a spring housing having:
  - a side; and
  - a base having a threaded joint articulated to the main housing;
- a spring for receiving a load and distributing the load to the main housing via the base of the spring housing and the threaded joint, the spring having one end and a distal end, with the one end affixed to the base of the spring housing; and
- a disk forming an aperture therein, with the disk having an inside diameter with threading mechanically associated with the shank of the rod end, an outside perimeter area to which the distal end of the spring is affixed, and a beveled edge.

12. An aircraft door panel assembly having a load balancing actuator, the load balancing actuator comprising:
- an aircraft structure;
- a movable member;
- a main housing having a tail end connected to the aircraft structure;
- a rod end having an eye, a shank, and a foot, with the eye of the rod end connected to the movable member;
- a shaft mechanically associated with the foot of the rod end;
- a gear assembly mechanically associated with the shaft and the housing;
- a motor mechanically associated with the shaft and the gear assembly;
- a spring housing having a side, a base, and a connector, the connector connecting the base of the spring housing to the main housing;
- a spring for receiving a load and distributing the load to the main housing via the base of the spring housing and the connector, the spring having one end and a distal end, with the one end affixed to the base of the spring housing; and
- an end cap having an inside diameter and a beveled edge; wherein the end cap is affixed to the distal end of the spring.

13. A method for effecting movement of a movable member relative to a structural member, the method comprising steps of:
- transferring motion from a motion transfer assembly to a shaft associated with a main housing to selectively extend and retract the shaft from and into the main housing;
- receiving a load from an external source by a load balancing assembly; and
- transferring the load from the load balancing assembly to the main housing and the structural member;
- wherein the load balancing assembly includes;
  - a spring housing having a base;
  - a spring having one end and a distal end, the one end affixed to the base of the spring housing; and
  - an end cap with an inside diameter and a beveled edge.

14. The method of claim 13, wherein the structural member comprises a door panel.

15. The method of claim 13, wherein the motion transfer assembly comprises:
- a gear assembly mechanically associated with the shaft; and
- a motor mechanically associated with the gear assembly.

16. The method of claim 15, further comprising steps of:
- reversing a turning direction of the motor to extend the shaft via the gear assembly; and
- transferring motion directly from the spring in an initially compressed state to a load.

17. The method of claim 13, wherein the distal end of the spring is attached to the end cap.

18. A method for effecting movement between a structural member and a movable member, the method comprising steps of:
- transferring motion from a motor to a shaft via a gear assembly, with the shaft and the gear assembly associated with a main housing;
- selectively expanding and compressing a spring attached to spring housing and an end cap, with the end cap surrounding and interacting with a rod end attached to the shaft;
- driving the end cap axially in a direction away from a tail end of the main housing; and
- transferring a load from an external source to the main housing via the rod end, the end cap, and the spring.

19. The method of claim 18, further comprising steps of:
- reversing a turning direction of the motor to extend the shaft via the gear assembly; and
- transferring motion directly from the spring in a compressed state to the load.

20. The method of claim 18, further comprising a step of connecting the spring housing to the main housing with a threaded joint.

21. The method of claim 18, wherein the end cap comprises a disk forming an aperture therein.

22. The method of claim 18, wherein the disk comprises:
- an inside diameter having threading mechanically associated with the rod end; and
- a beveled edge.

* * * * *